US010379706B2

(12) United States Patent
Kim et al.

(10) Patent No.: US 10,379,706 B2
(45) Date of Patent: Aug. 13, 2019

(54) DEVICE FOR AND METHOD OF CHANGING SIZE OF DISPLAY WINDOW ON SCREEN

(71) Applicant: Samsung Electronics Co. Ltd., Suwon-si, Gyeonggi-do (KR)

(72) Inventors: Chul-joo Kim, Suwon-si (KR); Kang-tae Kim, Yongin-si (KR); Eun-young Kim, Yongin-si (KR); Kwang-won Sun, Suwon-si (KR); Jae-yeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 13/767,610

(22) Filed: Feb. 14, 2013

(65) Prior Publication Data

US 2013/0227458 A1   Aug. 29, 2013

(30) Foreign Application Priority Data

Feb. 24, 2012 (KR) ........................ 10-2012-0019181

(51) Int. Cl.
*G06F 3/0486* (2013.01)
*G06F 3/0481* (2013.01)
*G06F 3/0485* (2013.01)
*G06F 3/0483* (2013.01)
*G06F 3/14* (2006.01)
*G06F 9/54* (2006.01)
*G06F 17/24* (2006.01)
(Continued)

(52) U.S. Cl.
CPC ........ *G06F 3/0484* (2013.01); *G06F 3/04883* (2013.01)

(58) Field of Classification Search
CPC .... G06F 3/0486; G06F 3/0481; G06F 9/4443; G06F 9/543; G06F 17/24; G06F 17/30905; G09G 5/14; G09G 2370/027
USPC .......................................... 715/769
See application file for complete search history.

(56) References Cited

U.S. PATENT DOCUMENTS 5,956,032 A * 9/1999 Argiolas ................ 715/798
6,016,145 A * 1/2000 Horvitz et al. ............... 715/788
(Continued)

FOREIGN PATENT DOCUMENTS

CN   1344989 A   4/2002
CN   1458576 A   11/2003
(Continued)

OTHER PUBLICATIONS

Chinese Office Action dated Jan. 10, 2018, issued in Chinese Patent Application No. 201310058657.9.
(Continued)

*Primary Examiner* — Shourjo Dasgupta
(74) *Attorney, Agent, or Firm* — Jefferson IP Law, LLP (57) ABSTRACT

A device for and method of changing a size of a display window on a screen are provided. The method includes receiving a user input for changing the size of the display window, moving a guideline and displaying the moving guideline according to the user input, the guideline indicating the size of the display window, determining a changed size of the display window after the user input is terminated, and displaying the display window with the determined changed size, wherein contents are displayed in the displayed display window.

22 Claims, 7 Drawing Sheets

(51) Int. Cl.
*G09G 5/14* (2006.01)
*G06F 3/0484* (2013.01)
*G06F 3/0488* (2013.01)

(56) References Cited

U.S. PATENT DOCUMENTS

| | | | |
|---|---|---|---|
| 6,229,536 B1* | 5/2001 | Alexander | G01R 13/345 |
| | | | 345/440 |
| 6,686,852 B1 | 2/2004 | Guo | |
| 9,569,063 B2 | 2/2017 | Hwang et al. | |
| 2003/0076362 A1 | 4/2003 | Terada | |
| 2004/0056894 A1* | 3/2004 | Zaika et al. | 345/762 |
| 2004/0056903 A1 | 3/2004 | Sakai | |
| 2005/0235220 A1 | 10/2005 | Duperrouzel et al. | |
| 2006/0001650 A1 | 1/2006 | Robbins et al. | |
| 2007/0192726 A1 | 8/2007 | Kim et al. | |
| 2008/0052637 A1* | 2/2008 | Ben-Yoseph et al. | 715/800 |
| 2008/0172609 A1 | 7/2008 | Rytivaara | |
| 2008/0214239 A1 | 9/2008 | Hashimoto et al. | |
| 2008/0320396 A1 | 12/2008 | Mizrachi et al. | |
| 2009/0147297 A1* | 6/2009 | Stevenson | 358/1.15 |
| 2009/0307631 A1 | 12/2009 | Kim et al. | |
| 2009/0322690 A1 | 12/2009 | Hiltunen et al. | |
| 2010/0062811 A1 | 3/2010 | Park et al. | |
| 2010/0088634 A1 | 4/2010 | Tsuruta et al. | |
| 2010/0107128 A1* | 4/2010 | Thukral | G06F 3/1454 |
| | | | 715/867 |
| 2010/0153074 A1* | 6/2010 | Yanami | G06F 17/11 |
| | | | 703/1 |
| 2010/0214278 A1 | 8/2010 | Miura | |
| 2010/0216448 A1 | 8/2010 | Jeon et al. | |
| 2010/0248788 A1 | 9/2010 | Yook et al. | |
| 2012/0127206 A1* | 5/2012 | Thompson et al. | 345/661 |
| 2012/0176322 A1 | 7/2012 | Karmi et al. | |
| 2012/0185781 A1* | 7/2012 | Guzman et al. | 715/752 |
| 2012/0303476 A1 | 11/2012 | Krzyzanowski et al. | |
| 2013/0120295 A1 | 5/2013 | Kim et al. | |
| 2013/0176212 A1* | 7/2013 | Nan | G06F 3/033 |
| | | | 345/157 |

FOREIGN PATENT DOCUMENTS

| | | |
|---|---|---|
| CN | 1996285 A | 7/2007 |
| CN | 101352057 A | 1/2009 |
| CN | 101387954 A | 3/2009 |
| CN | 101477436 A | 7/2009 |
| CN | 102063256 A | 5/2011 |
| CN | 102129345 A | 7/2011 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-2009-0040140 A | 4/2009 |
| KR | 10-2010-0053823 A | 5/2010 |
| KR | 10-2013-0054073 A | 5/2013 |
| WO | 2008/090902 A1 | 7/2008 |
| WO | 2009/017175 A1 | 2/2009 |
| WO | 2009/028892 A2 | 3/2009 |

OTHER PUBLICATIONS

Korean Office Action dated Apr. 18, 2018, issued in Korean Patent Application No. 10-2012-0019181.
Korean Office Action dated Oct. 26, 2018, issued in the Korean Application No. 10-2012-0019181.

* cited by examiner

DEVICE FOR AND METHOD OF CHANGING SIZE OF DISPLAY WINDOW ON SCREEN

PRIORITY

This application claims the benefit under 35 U.S.C. § 119(a) of Korean patent application filed on Feb. 24, 2012 in the Korean Intellectual Property Office and assigned Serial No. 10-2012-0019181, the entire disclosure of which is hereby incorporated by reference.

BACKGROUND OF THE INVENTION

1. Field of the Invention

The present invention relates to a device for and method of changing the size of a display window on a screen. More particularly, the present invention relates to a device for and method of displaying a display window having a changed size after a user input for changing the size of the display window is terminated.

2. Description of the Related Art

In general, a touch-screen is a device that detects the presence and location of a touch in a display area, thereby allowing a touch input on the display area. The touch-screen is generally formed by assembling a touch panel together with a display. The touch-screen is increasingly used due to its convenience.

According to the developments of central processing units and memory embedded in a device, a high quality moving image file may be executed in the device, and display windows for a large number of applications may be displayed on the screen of the device.

Also, if a user intends to change the size of a display window displayed on a screen of the device, the device should also change the sizes of contents displayed in the display window while the size of the display window is changed, and thus, resources of the device are wasted. In addition, if the size of the display window is small, it is difficult for a user to accurately select a portion of the display window and to change the size of the display window.

Therefore, a need exists for a device for and method of changing the size of a display window on a screen by using a small number of resources.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a device for and method of changing the size of a display window on a screen by using a small number of resources.

Another aspect of the present invention is to provide a device for and method of displaying a display window having a changed size on a screen, after a user input for changing the size of the display window is terminated.

Another aspect of the present invention further is to provide a device for and method of providing guidelines for changing a display window's size while a user input for changing the size of the display window is received.

According to an aspect of the present invention, a method of changing a size of a display window on a screen is provided. The method includes receiving a user input for changing the size of the display window, moving a guideline indicating the size of the display window according to the user input and displaying the moving guideline, determining a changed size of the display window after the user input is terminated, and displaying the display window with the determined changed size, wherein contents are displayed in the displayed display window.

While the guideline is moving and the moving guideline is displayed, the display window may be displayed with the size of the display window before the user input is received.

The contents may be moving images, and the displaying of the contents may include displaying the contents with a resolution corresponding to the determined changed size after the user input is terminated.

The method may further include displaying a guide point on at least one side of the display window, wherein the receiving of the user input includes selecting the guide point and moving the selected guide point.

The guide point may be used for moving a side of the display window, the side of the display window including the guide point.

The side of the display window may be moved when the guide point is selected, and dragged and dropped.

The method may further include displaying a guide point on at least one vertex of the display window, wherein the receiving of the user input includes selecting the guide point and moving the selected guide point.

The user input may include an input for selecting a border of the display window, dragging and dropping the selected border, and flicking the selected border toward a predetermined position of the screen, wherein the displaying of the display window includes moving the display window displayed with the determined size to the predetermined position.

The changed size of the display window may be set within a predetermined range, and the determining of the changed size of the display window may include determining the changed size of the display window within the set predetermined range.

The method may further include increasing a thickness of at least one side of the display window and displaying the at least one side of the display window having increased thickness, wherein the receiving of the user input includes selecting and moving the at least one side of the display window having the increased thickness.

According to another aspect of the present invention, a non-transitory computer-readable recording medium is provided having recorded thereon a program for executing the method of changing a size of a display window on a screen, which is first described above.

According to yet another aspect of the present invention, a device for changing a size of a display window on a screen is provided. The device includes an input unit that receives a user input for changing the size of the display window, a display unit that displays the display window on the screen, and displays movement of a guideline indicating the size of the display window according to the user input, and a size determiner that determines a changed size of the display window after the user input is terminated, wherein the display unit displays the display window with the determined changed size after the user input is terminated and displays contents in the displayed display window.

While the guideline is moving and the moving guideline is displayed, the display unit may display the display window with the size of the display window before the user input is received.

The contents may be moving images, and the display unit may display the contents with a resolution corresponding to the determined changed size after the user input is terminated.

The display unit may display a guide point on at least one side of the display window, and the input unit may select the guide point and may move the selected guide point.

The guide point may be used for moving a side of the display window, the side of the display window including the guide point.

The input unit may receive a user input for selecting the guide point, and dragging and dropping the selected guide point, and the display unit may move the side of the display window according to the user input.

The display unit may display a guide point on at least one vertex of the display window, and the input unit may select the guide point and may move the selected guide point.

The input unit may receive the user input for selecting a border of the display window, dragging and dropping the selected border, and flicking the selected border toward a predetermined position of the screen, and the display unit may move the display window displayed with the determined changed size to the predetermined position.

The changed size of the display window may be set within a predetermined range, and the size determiner may determine the changed size of the display window to be within the set predetermined range.

The display unit may increase a thickness of at least one side of the display window and may display the at least one side of the display window having the increased thickness, and the input unit may receive a user input for selecting and moving the at least one side of the display window having the increased thickness.

According to still another aspect of the present invention, a method of changing a size of a display window on a screen is provided. The method includes increasing a thickness of at least one side of the display window and displaying the at least one side of the display window having the increased thickness, receiving a user input for selecting and moving the at least one side of the display window having the increased thickness, determining a changed size of the display window according to the user input, and displaying the display window with the determined changed size.

According to a further aspect of the present invention, a non-transitory computer-readable recording medium is provided having recorded thereon a program for executing the method of changing a size of a display window on a screen, which is first described above.

According to an exemplary embodiment of the present invention, the size of a display window on a screen may be changed by using a small number of resources.

Also, according to an exemplary embodiment of the present invention, a display window having a changed size may be displayed on a screen, after a user input for changing the size of the display window is terminated.

Also, according to an exemplary embodiment of the present invention, guidelines for changing a display window' size may be provided when a user input for changing the size of the display window is received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, it can be directly connected to the other element, or it can be electrically connected to the other element by having intervening elements interposed there between. Also, when a part "includes" or "comprises" an element, unless there is a particular description contrary thereto, the part can further include other elements, not excluding the other elements.

Expressions such as "at least one of," when preceding a list of elements, modify the entire list of elements and do not modify the individual elements of the list.

Figure 1:
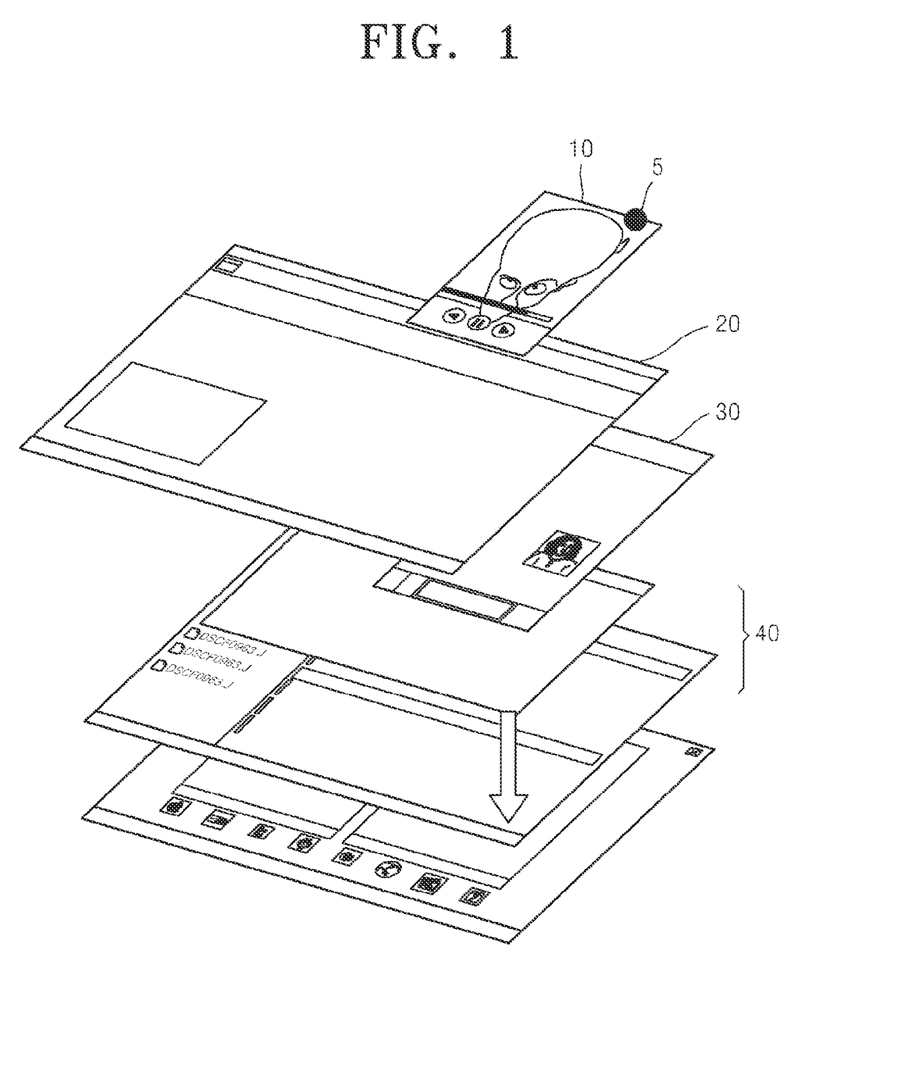
FIG. 1 is a diagram illustrating a plurality of display windows displayed to overlap each other on a touch-screen, according to an exemplary embodiment of the present invention.

FIG. 1 is a diagram illustrating a plurality of display windows displayed to overlap each other on a touch-screen, according to an exemplary embodiment of the present invention.

As illustrated in FIG. 1, a plurality of display windows 10, 20, 30, and 40 may be displayed to overlap each other on a touch-screen. A pin-up display window 10 set so as to be displayed at the highest position of a screen may always be displayed at the highest position of the screen when the pin-up display window is displayed together with other display windows on the screen. Also, an icon 5 may be displayed in a predetermined area of the pin-up display window 10. For example, in the pin-up display window 10, a pin-shaped icon may be displayed as if it is stuck in the pin-up display window 10.

A whole screen mode display window 20 is set so as to be displayed on the entire screen may be displayed to have the same size as the screen.

A part screen mode display window 30 set so as to be displayed on a part of the screen may be suitable for applications supporting displaying a window of a smaller size than the screen. Also, the part screen mode display window 30 may be suitable for applications providing, for example, a chatting function, memo function, and the like.

Also, a free size mode display window 40 is displayed on a part of the screen and may be a window of which size may be freely adjusted by a user input.

Also, the display windows 10, 20, 30, and 40 may be displayed to overlap each other, and a predetermined window of the display windows 10, 20, 30, and 40 may be displayed according to a type of application.

Figure 2:
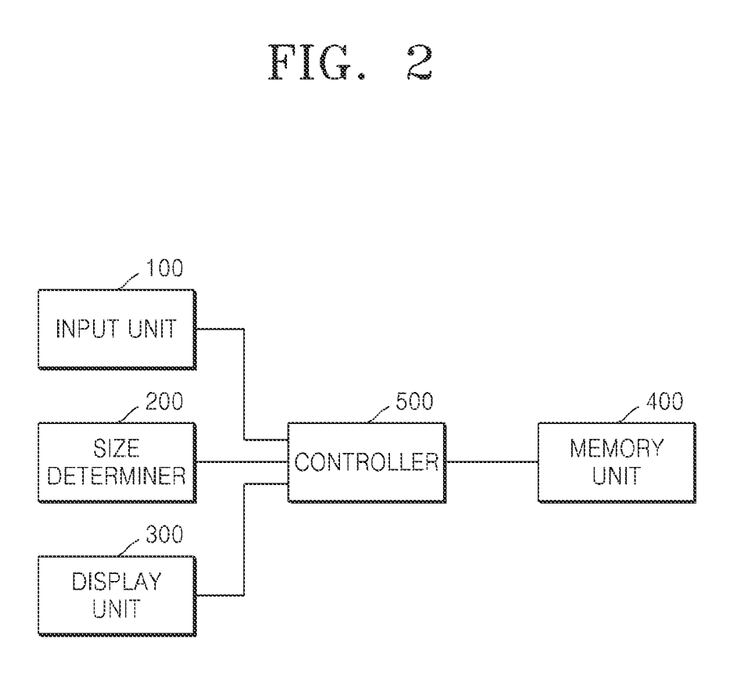
FIG. 2 is a block diagram of a device for changing a size of a display window on a screen, according to an exemplary embodiment of the present invention.

FIG. 2 is a block diagram of a device for changing a size of a display window on a screen, according to an exemplary embodiment of the present invention.

As illustrated in FIG. 2, a device includes an input unit 100, a size determiner 200, a display unit 300, a memory unit 400, and a controller 500.

The input unit 100 receives a user input that is input to the device. A user may touch a predetermined area on a screen of the device, and the input unit 100 may receive a user input according to the user's touch. The input unit 100 may receive a user input from an input tool such as a keyboard, a mouse, a stylus, or the like.

Also, the input unit 100 may receive a user input for changing a display window. In detail, the user may select a border of a display window displayed on the screen of the device and drag & drop or flick the selected border, and the input unit 100 may receive such a user input.

The size determiner 200 determines a size (hereinafter, referred to as a changed size of a display window) to which a display window is changed from an original size according to a user input for changing the size of the display window. The user may change the size of the display window by selecting a border of a display window, and the size determiner 200 may determine the size of the display window to be changed based on a user input.

Also, the size determiner 200 may determine the size of a display window after a user input for changing the size of the display window is terminated. For example, when a user selects a border of a display window through a touch input and moves the selected border, the size determiner 200 may determine a changed size of the display window after the touch input of the user is terminated.

Also, the size determiner 200 may set the range of changing the size of a display window, and may determine the changed size of the display window within the set range. For example, when a user input for magnifying the size of a display window to be larger than a predetermined maximum size is received, the size determiner 200 may determine the predetermined maximum size as the changed size of the display window. In addition, when a user input for reducing the size of a display window to be smaller than a predetermined minimum size is received, the size determiner 200 may determine the predetermined minimum size as the changed size of the display window.

The display unit 300 displays a display window on the screen, and also displays a guideline indicating a changed size of the display window according to a user input. In detail, when a user intends to magnify or reduce a display window by selecting and moving a border of the display window, the display unit 300 may display guidelines indicating the size of the display window on the screen by moving the display window according to a user input. For example, when a user selects a vertex of a display window and moves the selected vertex, the display unit 300 may display a guideline of a display window including a moved vertex on the screen.

Also, the display unit 300 may display a guide point on a border of the display window, wherein the guide point is used to change the size of a display window. For example, when a user selects a predetermined vertex of a display window, the display unit 300 may display a guide point on a side of the display window, which includes the selected vertex. If a user selects a guide point displayed on the bottom side of a display window and moves the selected guide point up and down, the display unit 300 may display a guideline of a magnified or reduced display window on the screen by moving a side including the guide point up and down. Also, if a user selects a guide point displayed on the right side of a display window and moves the selected guide point from side to side, the display unit 300 may display a guideline of a magnified or reduced display window on the screen by moving a side including the guide point from side to side.

In addition, the display unit 300 may change the thickness of a border of a display window so that a user may change the size of the display window. For example, when a user selects a predetermined vertex of a display window or a bottom side border of the display window, the display unit 300 may display at least one side of the display window with an increased thickness. Accordingly, a user may change the size of a display window by touching the thick border of the display window. The display unit 300 may display an upper side border of a display window with an increased thickness when a user selects the upper side border of the display window. In this case, the user may move the display window by touching the thick upper side border of the display window.

The display unit 300 may display predetermined contents in a display window. The contents may include images and moving images, which are output through the display window, and for example, may include pictures of a web page, photographs, and video images. However, the present invention is not limited thereto.

While a user input for changing the size of the display window is received, the display unit 300 may display contents on the screen according to the size of the display window before a change thereof. In addition, after the user input for changing the size of the display window is terminated, the display unit 300 may confirm a changed size of the display window, and may change the size of the display window and then display contents in the changed display window with a resolution suitable for the confirmed changed size. For example, if a user input for magnifying a display window is received in the middle of reproducing moving images with a 100×200 resolution on the display window, while the user input is received, the display unit 300 may display a guideline while displaying reproduction images of the moving images with the 100×200 resolution. After the user input is terminated, the size determiner 200 may determine a changed size of the display window to be 150×300 according to the user input and the display unit 300 may adjust the resolution of the moving images to a 150× 300 resolution to display the moving image on the display window of which the size has been changed.

In addition, display unit 300 may move the display window having the changed size to a predetermined position. For example, when a user touches and drags a vertex of a display window and then flicks the vertex toward an upper side of the screen in the touched state, the display unit 300 may change the size of the display window and move a changed display window to the upper side of the screen.

The memory unit 400 stores various types of information used when the device changes the size of a display window displayed on the screen in response to a user input. The memory unit 400 may store various setting values related to operations of the device depending on a type of a user input.

The controller 500 controls the entire operation of the device, and controls the input unit 100, the size determiner 200, the display unit 300, and the memory unit 400 so that the device may change the size of a display window displayed on the screen in response to a user input.

Figure 3:
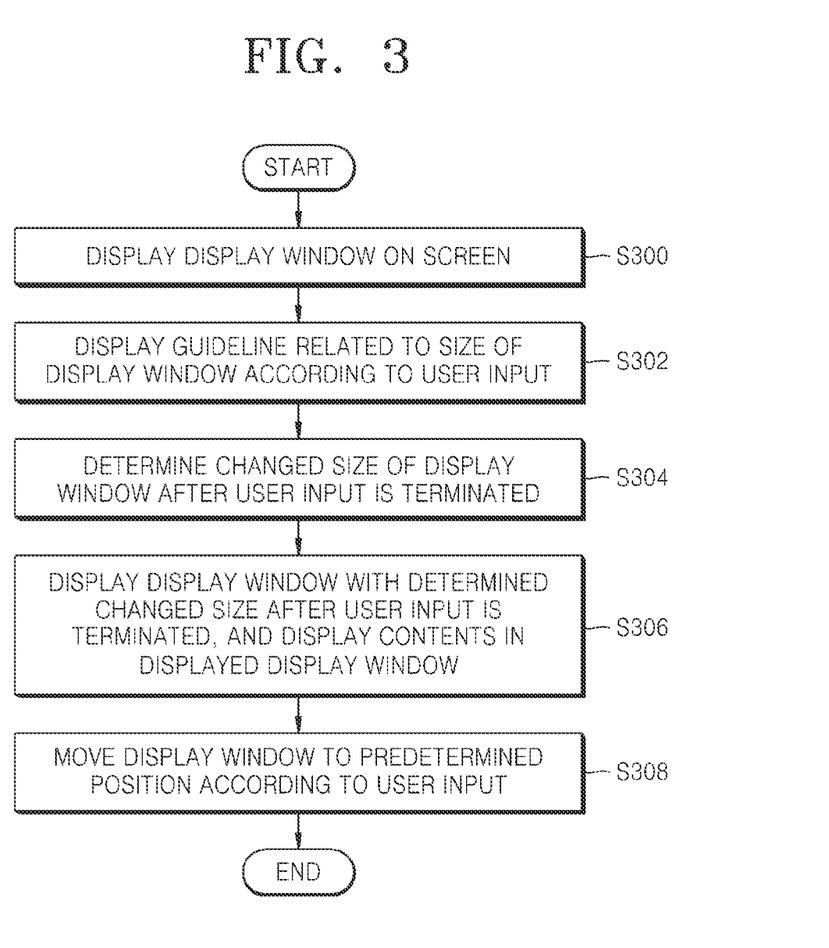
FIG. 3 is a flowchart illustrating a method of changing a size of a display window displayed on a screen, according to an exemplary embodiment of the present invention.

FIG. 3 is a flowchart illustrating a method of changing a size of a display window displayed on a screen, according to an exemplary embodiment of the present invention.

In operation S300, the device of FIG. 2 displays a display window on the screen. In operation S302, the device displays a guideline related to a changed size of the display window according to a user input. In operation S302, when a user intends to magnify or reduce a display window by selecting and moving a border of the display window, the device may display guidelines indicating the size of the display window on the screen by moving the guidelines according to a user input. For example, when a user selects a vertex of a display window and moves the selected vertex, the device may display a guideline of a display window including a moved vertex on the screen.

Also, in operation S302, the device may display a guide point, which is used to change the size of a display window, on a border of the display window. For example, when a user selects a predetermined vertex of a display window, the device may display a guide point on a side of the display window, which includes the selected vertex. If a user selects a guide point displayed on the bottom side of a display window and moves the selected guide point up or down, the device may display a guideline of a magnified or reduced display window on the screen by moving a side including the guide point in a corresponding manner. Also, if a user selects a guide point displayed on the right side of a display window and moves the selected guide point from side to side, the device may display a guideline of a magnified or reduced display window on the screen by moving a side including the guide in a corresponding manner.

In addition, in operation S302, the device may change the thickness of a border of a display window so that a user may change the size of the display window. For example, when a user selects a predetermined vertex of a display window or a bottom side border of the display window, the device may display at least one side of the display window with an increased thickness. Accordingly, a user may change the size of a display window by touching the thick border of the display window. The device may display an upper side border of a display window with an increased thickness when a user selects the upper side border of the display window. In this case, the user may easily move the display window by touching the thick upper side border of the display window.

In operation S304, the device determines a changed size of a display window after the reception of the user input is terminated. For example, when a user selects a border of a display window through a touch input and moves the selected border, the device may determine a changed size of the display window after the touch input of the user is terminated.

Also, in operation S304, the device may set the range of changing the size of a display window, and may determine the size of the display window within the set range. For example, when a user input for magnifying the size of a display window to be larger than a predetermined maximum size is received, the device may determine the predetermined maximum size as the changed size of the display window. In addition, when a user input for reducing the size of a display window to be smaller than a predetermined minimum size is received, the device may determine the predetermined minimum size as the changed size of the display window.

In operation S306, the device displays a display window with a determined changed size after a user input is terminated, and displays contents in the displayed display window. The contents may include images and moving images, which are output through the display window, and for example, may include pictures of a web page, photographs, and video images. However, the present invention is not limited thereto.

Also, in operation S306, while a user input for changing the size of the display window is received, the device may display contents on the screen according to the size of the display window before a change thereof. In addition, after the user input for changing the size of the display window is terminated, the device 300 may confirm a changed size of the display window, and may change the size of the display window and then display contents in the changed display window with a resolution suitable for a confirmed changed size. For example, if a user input for magnifying a display window is received in the middle of reproducing moving images with a 100×200 resolution on the display window, while the user input is received, the device may display a guideline while displaying reproduction images of the moving images with the 100×200 resolution. After the user input is terminated, the device may determine a changed size of the display window to be 150×300 according to the user input and may adjust the resolution of the moving images to a 150×300 resolution to display the moving image on the display window of which size has been changed.

In operation S308, the device moves the display window to a predetermined position according to a user input. For example, when a user touches and drags a vertex of a display window and then flicks the vertex toward an upper side of the screen in the touched state, the device may change the size of the display window and move a changed display window to the upper side of the screen.

An example of changing the size of a display window on a screen according to a user input and displaying a changed display window, according to an exemplary embodiment of the present invention, is described below with reference to FIGS. 4 through 8.

Figure 4A:
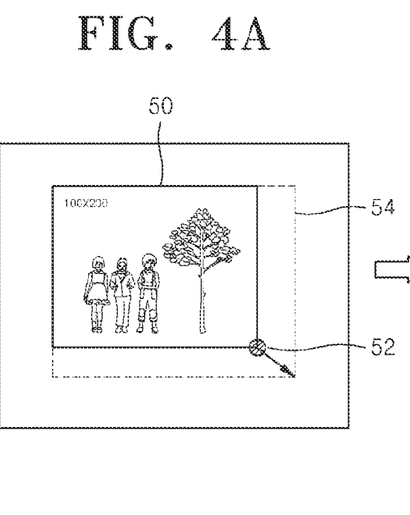
FIGS. 4A and 4B are diagrams illustrating an example in which a size of a display window is changed by using a guide point displayed in a vertex of the display window and then a changed display window is displayed, according to an exemplary embodiment of the present invention.
Figure 4B:
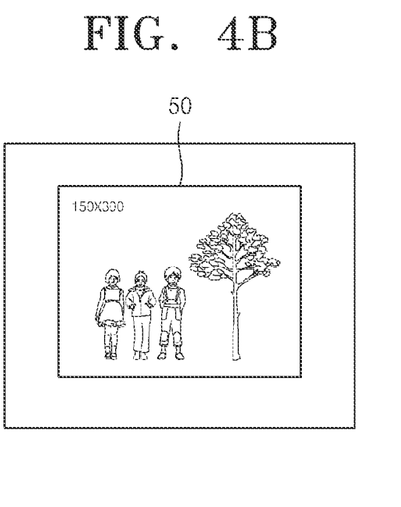

FIGS. 4A and 4B are diagrams illustrating an example in which a size of a display window is changed by using a guide point displayed in a vertex of the display window and then a changed display window is displayed, according to an exemplary embodiment of the present invention.

Referring to FIG. 4A, a display window 50 is displayed with the size of 100×200 on the screen of the device, and a user may select a vertex 52 of the display window 50 and may move the selected vertex 52. In this case, while the selected vertex 52 is moved, a guideline 54 indicating a changed size of the display window 50 may be displayed on the screen. Also, while the selected vertex 52 is moved, the display window 50 is displayed with the size of 100×200 and contents may be displayed in the display window 50. After a user input for moving the vertex 52 is terminated, the device may determine a changed size (for example, 150×300) of the display window 50 and as illustrated in FIG. 4B, may display the display window 50 and the contents by using the changed size.

Figure 5:
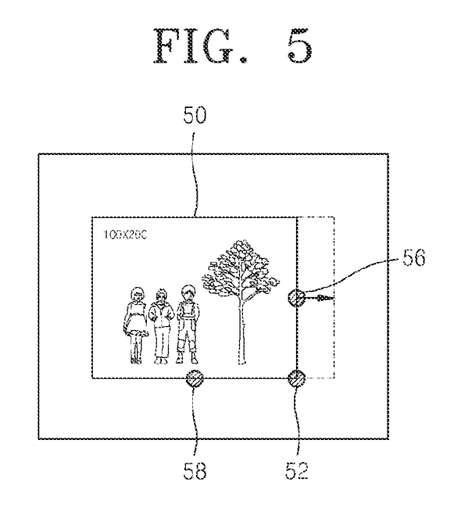
FIG. 5 is a diagram illustrating an example in which a size of a display window is changed by using a guide point displayed on a right side of the display window and then a changed display window is displayed, according to an exemplary embodiment of the present invention.

FIG. 5 is a diagram illustrating an example where a size of a display window is changed by using a guide point displayed on the right side of the display window and then a changed display window is displayed, according to an exemplary embodiment of the present invention.

As illustrated in FIG. 5, when a user selects a vertex 52 of a display window 50, a guide point 56 may be displayed on the right side of the display window 50 including the selected vertex. In addition, a guide point 58 may also be displayed on the bottom side of the display window 50 including the selected vertex. If a user selects the guide point 56 and then moves the selected guide point 56 to the right side, a guideline of a display window magnified to the right side along the moved guide point 56 may be displayed.

Figure 6:
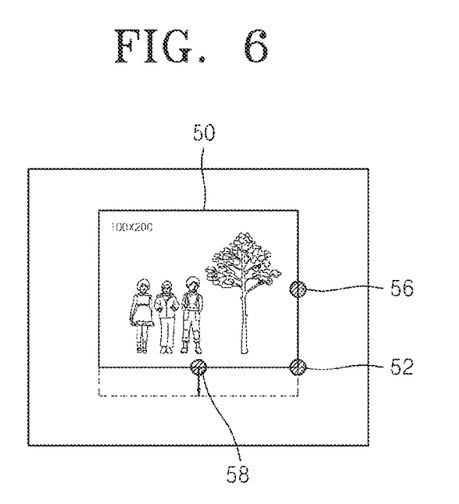
FIG. 6 is a diagram illustrating an example in which a size of a display window is changed by using a guide point displayed on a bottom side of the display window and then a changed display window is displayed, according to an exemplary embodiment of the present invention.

FIG. 6 is a diagram illustrating an example where a size of a display window is changed by using a guide point displayed on the bottom side of the display window and then a changed display window is displayed, according to an exemplary embodiment of the present invention.

As illustrated in FIG. 6, when a user selects a vertex 52 of a display window 50, a guide point 58 may be displayed on the bottom side of the display window 50 including the selected vertex. In addition, a guide point 56 may also be displayed on the right side of the display window 50 including the selected vertex. If the user selects the guide point 58 and then moves the selected guide point 58 downwards, a guideline of a display window magnified downwards along the moved guide point 58 may be displayed.

Figure 7A:
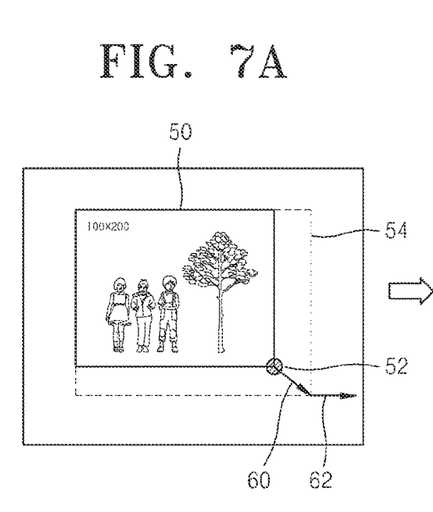
FIGS. 7A and 7B are diagrams illustrating an example in which a size of a display window is changed based on a user input and a changed display window is moved to a predetermined position, according to an exemplary embodiment of the present invention.
Figure 7B:
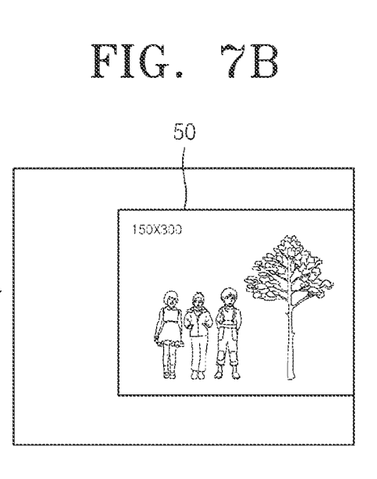

FIGS. 7A and 7B are diagrams illustrating an example where a size of a display window is changed based on a user input and a changed display window is moved to a predetermined position, according to an exemplary embodiment of the present invention.

As illustrated in FIGS. 7A and 7B, a user may touch and drag a vertex 52 of a display window 50 (refer to 60) and then flick the selected vertex 52 toward the right side of the screen 50 in the touched state (refer to 62). In this case, the device may change the size of the display window 50 via the drag operation. In this case, a guideline of a magnified display window may be displayed with the dragging of the vertex 52 (refer to 60). Also, the device may move the changed display window to the right side of the screen via the flick operation.

Figure 8A:
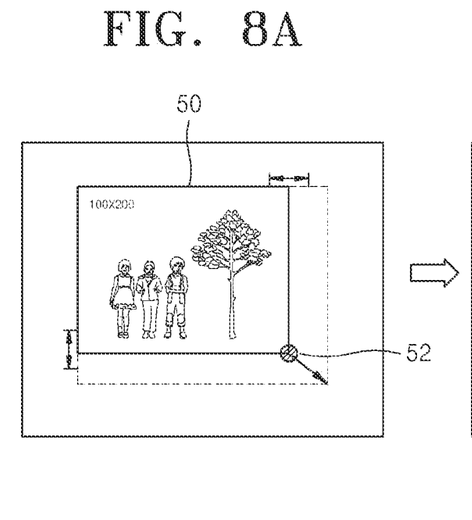
FIGS. 8A and 8B are diagrams illustrating an example in which a size of a display window is changed within a predetermined range, according to an exemplary embodiment of the present invention.
Figure 8B:
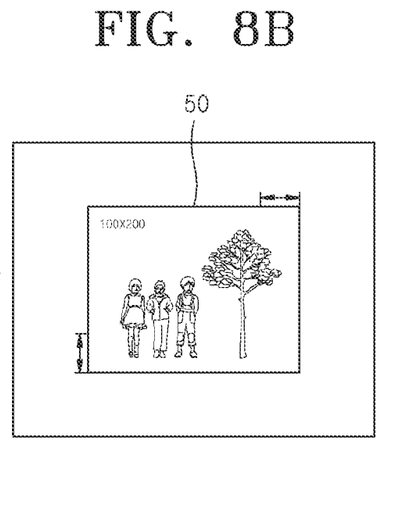

FIGS. 8A and 8B are diagrams illustrating an example where a size of a display window is changed within a predetermined range, according to an exemplary embodiment of the present invention.

As illustrated in FIGS. 8A and 8B, the device may set a range of change of the size of a display window 50 and may determine the size of the display window 50 within the set range. As illustrated in FIG. 8A, a user may select a vertex 52 of the display window 50 and then may move the selected vertex 52. In this case, although the user input is received for magnifying the size of the display window 50 to be larger than a predetermined maximum size, as in FIG. 8B, the device may magnify the display window 50 to the predetermined maximum size.

Figure 9A:
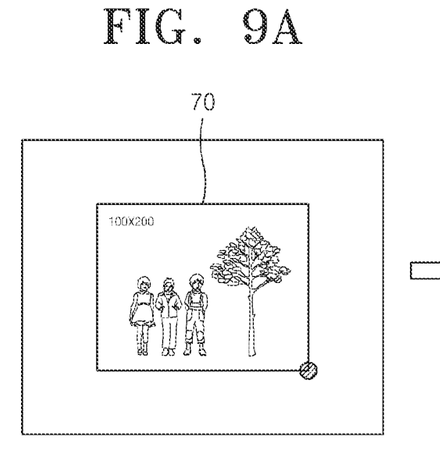
FIGS. 9A and 9B are diagrams illustrating an example in which a thickness of a border of a display window is changed, according to an exemplary embodiment of the present invention.
Figure 9B:
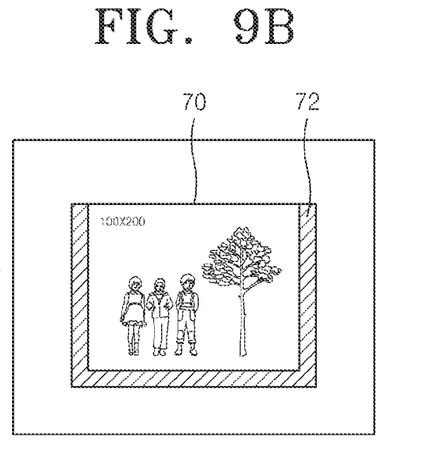

FIGS. 9A and 9B are diagrams illustrating an example where a thickness of a border of a display window is changed, according to an exemplary embodiment of the present invention.

As illustrated in FIGS. 9A and 9B, when a user selects a vertex of a display window 70, the left side, right side, and bottom side of the display window 70 may be displayed to be thicker (refer to 72). Also, the user may change the size of the display window 70 by selecting at least one of the left side, the right side, and the bottom side, which are thick, and moving the selected at least one side. In addition, when the user selects the bottom side border of the display window 70, the left side, right side, and bottom side of the display window 70 may be displayed to be thicker (refer to 72). However, the present invention is not limited thereto.

Figure 10A:
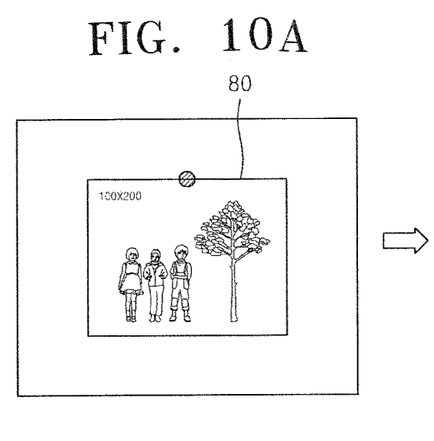
FIGS. 10A and 10B are diagrams illustrating an example in which a thickness of a border of a display window is changed, according to another exemplary embodiment of the present invention.
Figure 10B:
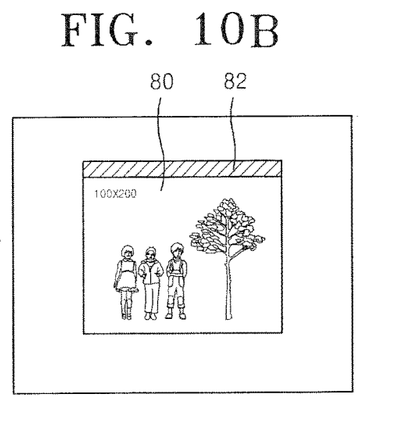

FIGS. 10A and 10B are diagrams illustrating an example where the thickness of a border of a display window is changed, according to an exemplary embodiment of the present invention.

As illustrated in FIGS. 10A and 10B, when a user selects the upper side border of a display window 80, the thickness of the upper side of the display window 80 may be displayed to be thicker (refer to 82). Also, the user may change the position of the display window 80 on a screen by selecting the thick upper side 82 of the display window 80 and moving the selected upper side.

The one or more exemplary embodiments of the present invention may be written as computer programs in a non-transitory computer-readable recording medium, e.g., a program module to be executed in computers, which include computer-readable commands. The non-transitory computer-readable recording medium may include any usable medium that may be accessed by computers, volatile and non-volatile media, and detachable and non-detachable media. The non-transitory computer-readable recording medium includes all of volatile and non-volatile media, and detachable and non-detachable media that are designed to store information including computer readable commands, data structures, program modules or other data.

The present invention may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art.

While the invention has been shown and described with reference to certain exemplary embodiments thereof, it will be understood by those of skilled in the art that various changes in form and details may be made therein without departing from the spirit and scope of the invention as defined by the appended claims and their equivalents.

What is claimed is:

1. A method of changing a display window on a screen, the method comprising:
    receiving a first touch input on the screen;
    determining a position of the first touch input on a display window;
    when the position of the first touch input is on an upper side of the display window, increasing a thickness of only the upper side of the display window;
    when the position of the first touch input is on at least one of a left side, a right side, or a bottom side of the display window, increasing a thickness of only the left side, the right side, and the bottom side of the display window;
    receiving a second touch input on the display window;
    upon determining that the position of the first touch input is on the upper side of the display window, changing a position of the display window based on the second touch input, when the second touch input is on the increased upper side of the display window;
    upon determining that the position of the first touch input is on the at least one of the left side, the right side, or the bottom side of the display window, changing a size of the display window based on the second touch input, when the second touch input is on one of the increased left side, the increased right side, or the increased bottom side of the display window; and
    displaying the changed display window on the screen,
    wherein the first touch input for increasing the thickness of the at least one side of the display window is different than the second touch input for changing the position or the size of the display window.

2. The method of claim 1, further comprising, upon determining that the position of the first touch input is on the upper side of the display window:
    displaying a guideline indicating the position of the display window according to the second touch input; and
    displaying the guideline to move,
    wherein, while the guideline is moving and the moving guideline is displayed, the display window is displayed at the position of the display window before the second touch input is received.

3. The method of claim 2, wherein the guideline is different from an outline of the display window.

4. The method of claim 1, further comprising, upon determining that the position of the first touch input is on the at least one of the left side, the right side, or the bottom side of the display window:
    displaying a guideline indicating the size of the display window according to the second touch input; and
    displaying the guideline to move,
    wherein, while the guideline is moving and the moving guideline is displayed, the display window is displayed at the size of the display window before the second touch input is received.

5. The method of claim 1, further comprising, upon determining that the position of the first touch input is on the at least one of the left side, the right side, or the bottom side of the display window:
    displaying a guide point on at least one side of the display window,
    wherein the receiving of the second touch input comprises selecting the guide point and moving the selected guide point.

6. The method of claim 5, wherein the guide point is used for moving a side of the display window, the side of the display window comprising the guide point.

7. The method of claim 6, wherein the side of the display window is moved when the guide point is selected, and dragged and dropped.

8. The method of claim 1, further comprising, upon determining that the position of the first touch input is on the at least one of the left side, the right side, or the bottom side of the display window:
    displaying a guide point on at least one vertex of the display window,
    wherein the receiving of the second touch input comprises selecting the guide point and moving the selected guide point.

9. The method of claim 1,
    wherein the position of the first touch input is on the at least one of the left side, the right side, or the bottom side of the display window,
    wherein the second touch input comprises an input for selecting a border of at least one of the left side, the right side, or the bottom side of the display window, dragging and dropping the selected border, and flicking the selected border toward a predetermined position of the screen, and
    wherein the displaying of the display window comprises moving the display window displayed with a determined size to the predetermined position.

10. The method of claim 1,
    wherein the position of the first touch input is on the at least one of the left side, the right side, or the bottom side of the display window,
    wherein the changed size of the display window is set within a predetermined range, and
    wherein the determining of the changed size of the display window comprises determining the changed size of the display window within the set predetermined range.

11. A non-transitory computer-readable recording medium having recorded thereon a program for executing the method of claim 1.

12. The method of claim 1,
    wherein the changed position of the display window is set within a predetermined range, and
    wherein the determining of the changed position of the display window comprises determining the changed position of the display window within the set predetermined range.

13. A device for changing a display window on a screen, the device comprising:
- a display configured to display a display window on a screen;
- an input interface configured to receive touch inputs on the screen; and
- at least one processor configured to:
  - control the input interface to receive a first touch input on the screen of the display,
  - determine a position of the first touch input on the display window,
  - when the position of the first touch input is on an upper side of the display window, increase a thickness of only the upper side of the display window,
  - when the position of the first touch input is on at least one of a left side, a right side, or a bottom side of the display window, increasing a thickness of only the left side, the right side, and the bottom side of the display window;
  - control the input interface to receive a second touch input on the display window,
  - upon determining that the position of the first touch input is on the upper side of the display window, change a position of the display window based on the second touch input, when the second touch input is on the increased upper side of the display window,
  - upon determining that the position of the first touch input is on the at least one of the left side, the right side, or the bottom side of the display window, change a size of the display window based on the second touch input, when the second touch input is on one of the increased left side, the increased right side, or the increased bottom side of the display window, and
  - control the display to display the changed display window on the screen,
- wherein the first touch input for increasing the thickness of the at least one side of the display window is different than the second touch input for changing the position or the size of the display window.

14. The device of claim 13,
- wherein the at least one processor is further configured to, upon determining that the position of the first touch input is on the upper side of the display window:
  - control the display to display a guideline indicating the position of the display window according to the second touch input, and
  - control the display to display the guideline to move,
- wherein, while the guideline is moving and the moving guideline is displayed, the display displays the display window at the position of the display window before the second touch input is received.

15. The device of claim 13,
- wherein the at least one processor is further configured to, upon determining that the position of the first touch input is on the at least one of the left side, the right side, or the bottom side of the display window:
  - control the display to display a guideline indicating the position of the display window according to the second touch input, and
  - control the display to display the guideline to move, and
- wherein, while the guideline is moving and the moving guideline is displayed, the display displays the display window with the size of the display window before the second touch input is received.

16. The device of claim 13,
- wherein the at least one processor is further configured to, upon determining that the position of the first touch input is on the at least one of the left side, the right side, or the bottom side of the display window:
  - control the display to display a guide point on the side of the display window, and
  - control the input interface to select the guide point and move the selected guide point.

17. The device of claim 16, wherein the guide point is used for moving the side of the display window, the side of the display window comprising the guide point.

18. The device of claim 17,
- wherein the input interface receives the second touch input for selecting the guide point, and dragging and dropping the selected guide point, and
- wherein the at least one processor is further configured to control the display to display the side of the display window to move according to the second touch input.

19. The device of claim 13,
- wherein the at least one processor is further configured to, upon determining that the position of the first touch input is on the at least one of the left side, the right side, or the bottom side of the display window:
  - control the display to display a guide point on at least one vertex of the display window, and
  - control the input interface to select the guide point and move the selected guide point.

20. The device of claim 13,
- wherein the position of the first touch input is on the at least one of the left side, the right side, or the bottom side of the display window,
- wherein the input interface receives the second touch input for selecting a border of at least one of the left side, the right side, or the bottom side of the display window, dragging and dropping the selected border, and flicking the selected border toward a predetermined position of the screen, and
- wherein the at least one processor is further configured to control the display to display the display window to move with the determined changed size to the predetermined position.

21. The device of claim 13,
- wherein the position of the first touch input is on the at least one of the left side, the right side, or the bottom side of the display window,
- wherein the changed size of the display window is set within a predetermined range, and
- wherein the at least one processor is further configured to determine the changed size of the display window to be within the set predetermined range.

22. The device of claim 13,
- wherein the changed position of the display window is set within a predetermined range, and
- wherein the at least one processor is further configured to determine the changed position of the display window to be within the set predetermined range.

* * * * *